(12) United States Patent
Nishimura et al.

(10) Patent No.: US 12,258,298 B2
(45) Date of Patent: Mar. 25, 2025

(54) CERAMIC MEMBER MANUFACTURING METHOD, CERAMIC GREEN BODY, AND CERAMIC MEMBER MANUFACTURING SYSTEM

(71) Applicant: NGK INSULATORS, LTD., Nagoya (JP)

(72) Inventors: Rie Nishimura, Nagoya (JP); Shinji Fujisaki, Kuwana (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 886 days.

(21) Appl. No.: 17/149,864

(22) Filed: Jan. 15, 2021

(65) Prior Publication Data

US 2021/0130245 A1    May 6, 2021

Related U.S. Application Data

(63) Continuation of application No. PCT/JP2019/043300, filed on Nov. 5, 2019.

(30) Foreign Application Priority Data

Feb. 13, 2019  (JP) .................................. 2019-023733

(51) Int. Cl.
*C04B 41/45*  (2006.01)
*C04B 41/00*  (2006.01)

(52) U.S. Cl.
CPC ........ *C04B 41/459* (2013.01); *C04B 41/0072* (2013.01); *C04B 2235/6021* (2013.01)

(58) Field of Classification Search
CPC .............. C04B 41/459; C04B 41/0072; C04B 2235/6021; C04B 41/009; C04B 41/81;
(Continued)

(56) References Cited

U.S. PATENT DOCUMENTS

| 4,769,310 A | * | 9/1988 | Gugger | ................. | C03C 23/001 427/555 |
| 5,298,476 A | * | 3/1994 | Hotta | .................... | G02F 1/0147 503/227 |

(Continued)

FOREIGN PATENT DOCUMENTS

| JP | 6063914 A | 4/1985 |
| JP | 878273 A | 3/1996 |

(Continued)

OTHER PUBLICATIONS

English Translation of the International Preliminary Report on Patentability, issued in corresponding International Application No. PCT/JP2019/043300 Date of Mailing Aug. 26, 2021 (6 pages).

(Continued)

*Primary Examiner* — Jeffrey M Wollschlager
(74) *Attorney, Agent, or Firm* — FLYNN THIEL, P.C.

(57) ABSTRACT

A method for manufacturing a ceramic member includes a mark process for forming a mark indicating information about a ceramic green body on the ceramic green body by using a mark material capable of being erased by a predetermined heat treatment; and a heat treatment process for erasing the mark by applying the ceramic green body to the predetermined heat treatment.

3 Claims, 2 Drawing Sheets

(58) Field of Classification Search
CPC . C04B 35/00; C04B 41/4572; C04B 41/4578; C04B 41/48; C04B 41/5001
See application file for complete search history.

(56) References Cited

U.S. PATENT DOCUMENTS

| | | | | |
|---|---|---|---|---|
| 5,543,269 A | * | 8/1996 | Chatterjee | C04B 41/80 430/945 |
| 5,804,342 A | * | 9/1998 | Paz-Pujalt | B41M 1/34 430/945 |
| 5,843,599 A | * | 12/1998 | Paz-Pujalt | B41M 5/262 430/945 |
| 6,578,764 B1 | | 6/2003 | Hiraishi et al. | |
| 2007/0148403 A1 | * | 6/2007 | Yamamura | C04B 38/008 428/116 |
| 2008/0053333 A1 | * | 3/2008 | Johnson | C09D 11/36 501/17 |
| 2008/0187729 A1 | * | 8/2008 | Johnson | C04B 41/4572 428/210 |
| 2008/0280064 A1 | * | 11/2008 | Tokunaga | C09D 11/50 524/424 |
| 2008/0283588 A1 | * | 11/2008 | Dwyer | B28B 13/04 235/376 |
| 2009/0295044 A1 | * | 12/2009 | Amsden | C04B 41/87 264/630 |
| 2013/0273259 A1 | * | 10/2013 | Depardieu | C09D 183/04 524/379 |
| 2020/0198387 A1 | * | 6/2020 | Beabes | B41M 5/0047 |
| 2021/0300830 A1 | * | 9/2021 | Bories | C04B 41/0036 |

FOREIGN PATENT DOCUMENTS

| | | |
|---|---|---|
| JP | 2001102604 A | 4/2001 |
| JP | 200730378 A | 2/2007 |
| JP | 2007238400 A | 9/2007 |

OTHER PUBLICATIONS

International Search Report with English Translation issued in corresponding International Application No. PCT/JP2019/043300 date of mailing Jan. 21, 2020 (5 pages).

Written Opinion of International Searching Authority issued in corresponding International Application No. PCT/JP2019/043300 dated Jan. 21, 2020 (3 pages).

Japanese Office Action issued in corresponding Japanese Application No. 2020-523824, dated Sep. 8, 2020 (3 pages).

* cited by examiner

CERAMIC MEMBER MANUFACTURING METHOD, CERAMIC GREEN BODY, AND CERAMIC MEMBER MANUFACTURING SYSTEM

CROSS-REFERENCE TO RELATED APPLICATIONS

This is a continuation of PCT/JP2019/043300, filed Nov. 5, 2019, which claims priority from Japanese Application No. 2019-023733, filed Feb. 13, 2019 the entire contents of which are hereby incorporated by reference.

TECHNICAL FIELD

The present invention relates to a method for manufacturing a ceramic member and a system for manufacturing a ceramic member, and a ceramic green body.

BACKGROUND ART

In general, ceramic members are used in a wide range of applications such as supports for electrochemical elements, filters, sensors, catalyst carriers, heat insulating materials, soundproofing materials, seismic insulating materials, and biological materials.

A ceramic member is manufactured by firing a ceramic green body.

At the manufacturing site of ceramic parts, it is necessary to indicate information about the ceramic green body such as ensuring traceability, quality assurance, inspection results mark, manufacturing conditions mark, front and back orientation mark, and arrangement position mark on the ceramic green body.

Japanese Patent Application Laid-Open No. 2001-102604 proposes to form a mark for control of a manufacturing process to a region of a substrate in the middle of manufacturing that is not processed in a subsequent process by engraving or printing.

SUMMARY

However, when the method of Patent Document 1 is applied to a ceramic green body, the area on which the mark is formed is limited, so that not only is the mark difficult to see, but also the mark remains on the ceramic member after firing.

The present invention aims to provide a method for manufacturing a ceramic member, a manufacturing system for the ceramic member, and a ceramic green body, which can improve the visibility of a mark indicating information about the ceramic green body and can erase the mark on the ceramic member.

The method for manufacturing a ceramic member according to the present invention includes a mark process of forming a mark indicating information about a ceramic green body on the ceramic green body by using a mark material capable of being erased by a predetermined heat treatment, and a heat treatment process of erasing the mark by applying predetermined heat treatment on a ceramic green body.

According to the present invention, a method for manufacturing a ceramic member, a manufacturing system for the ceramic member, and a ceramic green body, which can improve the visibility of a mark indicating information about the ceramic green body and can erase the mark on the ceramic member can be provided.

DESCRIPTION OF EMBODIMENTS

1. First Embodiment

Ceramic Member Manufacturing System 100

Figure 1:
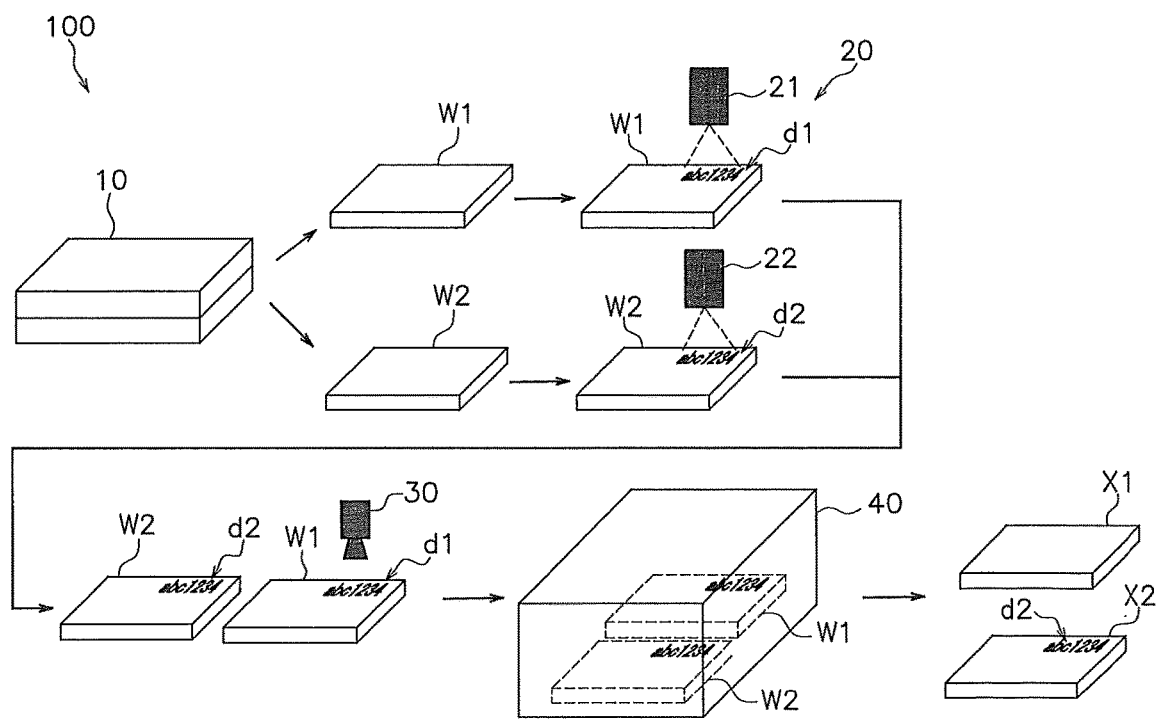
FIG. 1 is a schematic view showing a manufacturing system for a ceramic member according to the first embodiment.

A ceramic member manufacturing system 100 according to the first embodiment will be described with reference to the drawings. FIG. 1 is a schematic view showing the ceramic member manufacturing system 100. Although examples of the ceramic member include a support for an electrochemical element (fuel cell, electrolytic cell, or the like), a filter, a sensor, a catalyst carrier, a heat insulating material, a soundproofing material, a seismic insulating material, a support for a biological material, or the like, it is not limited thereto and it can be used for a wide range of purposes.

The ceramic member manufacturing system 100 includes a molding device 10, a mark device 20, a reading device 30, and a firing device 40.

1. Molding Device 10

Molding Process

The molding device 10 is used in a molding process of molding a first ceramic green body W1 and a second ceramic green body W2. Each of the first ceramic green body W1 and the second ceramic green body W2 may be an unfired green body, and its form is not particularly limited. The first ceramic green body W1 and the second ceramic green body W2 are a solidified body obtained by solidifying a molding slurry by a mold casting method or the like, a green compact obtained by molding ceramic powder by a compression method or the like, and green body obtained by molding molding clay by a molding extrusion method, or a tape obtained by molding a molding slurry by a doctor blade method or the like. Therefore, examples of the molding device 10 include a mold used in the mold casting method, the compression method, and the extrusion molding method, a blade used in the doctor blade method, or the like.

2. Mark Device 20

Mark Process

The mark device 20 is used to form a desired mark on the first ceramic green body W1 and the second ceramic green body W2 molded by the molding device 10. In the present embodiment, the mark device 20 includes a first mark device 21 and a second mark device 22. As the first mark device 21 and the second mark device 22, for example, an inkjet printer, a dispenser, a screen printing machine, a stamp transfer machine, a sticker sticking machine, or the like can be used.

The first mark device 21 forms the first mark d1 indicating information about the first ceramic green body W1 on the first ceramic green body W1 by using the first mark material. The first mark d1 is formed on the surface of the main body portion of the first ceramic green body W1. As a result, the first ceramic green body W1 including the main body portion and the first mark d1 formed on the surface of the main body portion is produced.

The first mark material is a material capable of being erased by a firing treatment (an example of "heat treatment") described later. Being erasable means that it is possible to shift from a visible state to an invisible state, or from a readable state to an unreadable state. The first mark material is erased as a result of evaporation, sublimation, oxidation, nitriding, or carbonization by heat treatment. The first mark material may be erased by heat treatment, and may remain on the first ceramic green body W1 or may not substantially remain on the first ceramic green body W1. The first mark material can be constituted by, for example, graphite, a resin compound, or the like. The first mark d1 may indicate information about the first ceramic green body W1, and its form is not particularly limited. Although examples of the first mark d1 include characters, numbers, symbols, pictures, one-dimensional codes, two-dimensional codes, and combinations thereof, it is not limited thereto. The position and size of the first mark d1 can be appropriately changed as desired.

The information indicated by the first mark d1 may be related to the first ceramic green body W1. Although information indicated by the first mark d1 includes a unique identification code, a predetermined design, quality (size, shape, material, strength, porosity, impurities, or the like), a predetermined inspection result (appearance, shape, size, defect, or the like), manufacturing conditions (lot, heat treatment, processing, or the like), front and back orientation, and positioning mark about the first ceramic green body W1 and combinations thereof are included, it is not limited thereto. Note that the positioning mark can be used for positioning the green body, for example, when a firing treatment is applied.

The second mark device 22 forms the second mark d2 indicating information about the second ceramic green body W2 on the second ceramic green body W2 by using the second mark material. The second mark d2 is formed on the surface of the main body portion of the second ceramic green body W2. As a result, the second ceramic green body W2 including the main body portion and the second mark d2 formed on the surface of the main body portion is produced.

The second mark material is a material incapable of being erased by the firing treatment described later. Being inerasable means that it does not shift from a visible state to an invisible state, or from a readable state to an unreadable state. At least a part of the second mark material remains on the second ceramic green body W2 even after the heat treatment. The second mark material can be constituted, for example, ceramics (zirconia, alumina, silica, magnesia, glass, or the like), metals (precious metals, transition metals, or the like) and other materials. The second mark d2 may indicate information about the second ceramic green body W2, and its form is not particularly limited. Although examples of the second mark d2 include characters, numbers, symbols, pictures, one-dimensional codes, two-dimensional codes, and combinations thereof, it is not limited thereto. The position and size of the second mark d2 can be appropriately changed as desired.

Information indicated by the second mark d2 may be related to the second ceramic green body W2. Although the information indicated by the second mark d2 includes the unique identification code, the predetermined design, quality, the predetermined inspection result, the manufacturing conditions, front and back orientation, the positioning mark about the second ceramic green body W2, and a combination thereof, it is not limited thereto. Although the information indicated by the second mark d2 may be different from the information indicated by the first mark d1, it may be partially overlapped.

3. Reading Device 30
Reading Process

The reading device 30 reads the first mark d1 formed on the first ceramic green body W1. Similarly, the reading device 30 reads the second mark d2 formed on the second ceramic green body W2. As a result, it is possible to prevent mixing up by confirming the unique identification code, confirm quality, inspection results and manufacturing conditions, or determine an arrangement at the time of firing based on the first mark d1 and the second mark d2.

The reading device 30 may be any device that can read the first mark d1 and the second mark d2. Although as the reading device 30, for example, a code reading device, an image recognition device, or the like can be used, it is not limited thereto.

4. Firing Device 40
Firing Process

The firing device 40 forms the first ceramic member X1 in which the first mark d1 is erased by applying the first ceramic green body W1 to a firing treatment. Further, the firing device 40 forms the second ceramic member X2 in which the second mark d2 remains by applying the second ceramic green body W2 to a firing treatment. As described above, in the manufacturing system 100 according to the present embodiment, the first ceramic member X1 in which the first mark d1 is erased and the second ceramic member X2 in which the second mark d2 remains can be produced separately.

The firing temperature in the firing device 40 may be any temperature as long as the first mark d1 can be erased and the first and second ceramic green bodies W1 and W2 can be sintered. For example, when the first mark d1 is constituted by a resin material, the first mark d1 can be sufficiently erased by setting the firing temperature in the firing device 40 to 500 degrees C. or higher. The firing time and firing atmosphere may be appropriately set according to the constituent materials of the first and second ceramic green bodies W1 and W2.

Note that the firing device 40 is an example of "the heat treatment device" according to the present invention, and the firing treatment is an example of "the predetermined heat treatment" according to the present invention.

2. Second Embodiment

Ceramics Member Manufacturing System 101

Figure 2:
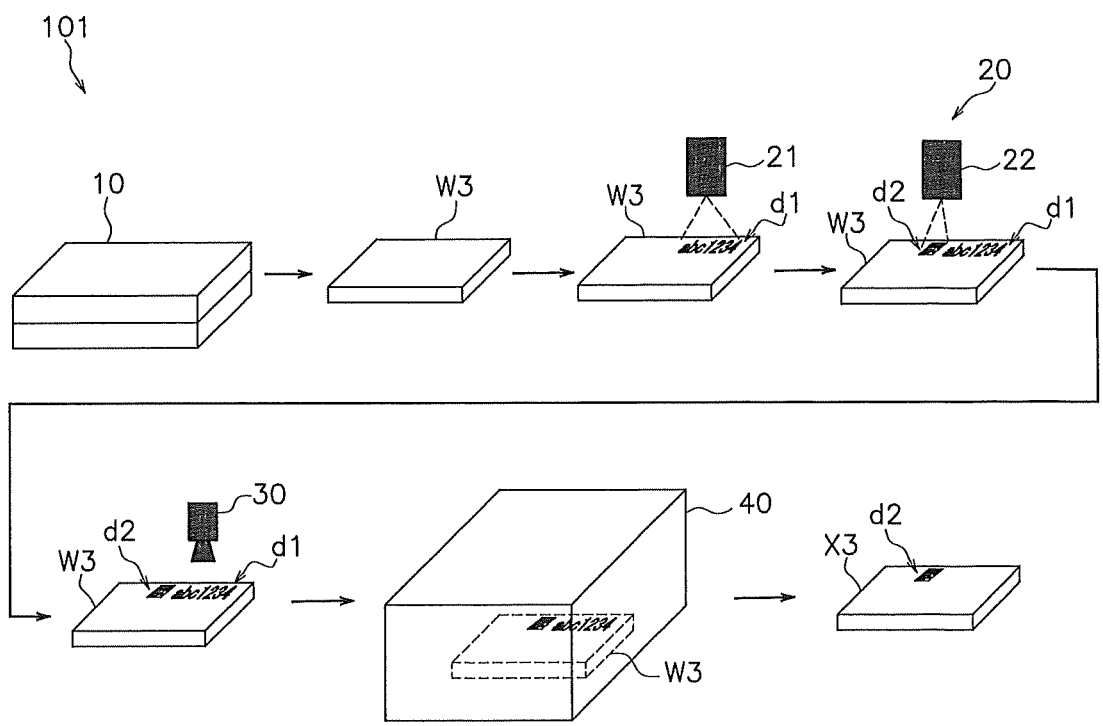
FIG. 2 is a schematic view showing a manufacturing system for a ceramic member according to the second embodiment.

The ceramic member manufacturing system 101 according to the second embodiment will be described with reference to the drawings. FIG. 2 is a schematic view showing a ceramic member manufacturing system 101. The configuration of the ceramic member manufacturing system 101 is the same as that of the ceramic member manufacturing system 101 according to the first embodiment.

The present embodiment is different from the first embodiment in that the first mark d1 capable of being erased by heat treatment and the second mark d2 incapable of being erased by heat treatment are formed on one ceramic green body. In the following, the differences will be mainly described.

1. Molding Device 10
Molding Process

The molding device 10 molds the third ceramic green body W3. The third ceramic green body W3 may be a solidified body obtained by solidifying a molding slurry by a mold casting method or the like, a green compact obtained by molding ceramic powder by a compression method or the like, and green body obtained by molding molding clay by a molding extrusion method, or a tape obtained by molding a molding slurry by a doctor blade method or the like.

2. Mark Device 20

Mark Process

The first mark device 21 forms the first mark d1 indicating information about the third ceramic green body W3 on the third ceramic green body W3 by using the first mark material. The first mark d1 is formed on the surface of the main body portion of the third ceramic green body W3.

The second mark device 22 forms the second mark d2 indicating information about the third ceramic green body W3 on the third ceramic green body W3 by using the second mark material. The second mark d2 is formed on the surface of the main body portion of the third ceramic green body W3. As a result, the third ceramic green body W3 including the main body portion and the first and second marks d1 and d2 formed on the surface of the main body portion is produced. Note that the information indicated by the second mark d2 may be different from the information indicated by the first mark d1, and may be partially overlapped.

3. Reading Device 30

Reading Process

The reading device 30 reads at least one of the first and second marks d1 and d2 formed on the third ceramic green body W3. As a result, it is possible to prevent mixing up by confirming the unique identification code, confirm quality, inspection results and manufacturing conditions, or determine an arrangement at the time of firing based on at least one of the first mark d1 and the second mark d2.

4. Firing Device 40

Firing Process

The firing device 40 forms the third ceramic member X3 in which the first mark d1 is erased and the second mark d2 remains by applying the third ceramic green body W3 to a firing treatment. As described above, in the manufacturing system 101 according to the present embodiment, it is possible to produce the third ceramic member X3 in which only the first mark d1 of the first and second marks d1 and d2 is erased.

The firing temperature in the firing device 40 may be any temperature as long as the first mark d1 can be erased and the third ceramic green body W3 can be sintered. For example, when the first mark d1 is composed of a resin material, the first mark d1 can be sufficiently erased by setting the firing temperature in the firing device 40 to 500 degrees C. or higher. The firing time and the firing atmosphere may be appropriately set according to the constituent materials of the third ceramic green body W3.

Note that the third ceramic green body W3 is an example of "the ceramic green body" according to the present invention. The firing device 40 is an example of "the heat treatment device" according to the present invention. The firing treatment is an example of "the predetermined heat treatment" according to the present invention.

VARIATIONS

Although the embodiments of the present invention have been described above, the present invention is not limited thereto, and various variations can be made without departing from the spirit of the present invention.

Although in the above-described first embodiment, the manufacturing system 100 is used for manufacturing the first ceramic member X1 from the first ceramic green body W1 and manufacturing the second ceramic member X2 from the second ceramic green body W2, it may be used only for manufacturing the first ceramic member X1 from the first ceramic green body W1. In this case, the mark device 20 need only have the first mark device 21.

Although in the above-described first and second embodiments, the manufacturing system 100,101 includes a reading device 30, it does not have to be equipped with a reading device 30, for example, when the operator visually recognizes the first and second marks d1 and d2.

Although in the first and second embodiments, the first mark d1 is erased by applying a firing treatment, the present invention is not limited thereto. In order to erase the first mark d1, a heat treatment other than the firing treatment (for example, annealing) may be applied. In this case, as the heat treatment device, an electric furnace, a hot air dryer, or the like can be used.

The invention claimed is:

1. A method for manufacturing a ceramic member comprising:
    a first mark process for forming a first mark indicating information about a ceramic green body on the ceramic green body by using a first mark material capable of being erased by a predetermined heat treatment;
    a second mark process for forming a second mark indicating information about the ceramic green body on the ceramic green body by using a second mark material not capable of being erased by the predetermined heat treatment, the second mark material being different from the first mark material; and
    a heat treatment process for erasing the first mark and not erasing the second mark by applying the ceramic green body to the predetermined heat treatment.

2. The method for manufacturing a ceramic member according to claim 1, wherein
    the information shown by the first mark is at least one of unique identification code, quality, inspection result, manufacturing condition, front and back orientation, and positioning mark of the ceramic green body, and
    the information shown by the second mark is at least one of unique identification code, quality, inspection result, manufacturing condition, front and back orientation, and positioning mark of the ceramic green body.

3. The method for producing a ceramic member according to claim 1, wherein
    the predetermined heat treatment is a firing treatment at 500 degrees C. or higher.

* * * * *